(12) United States Patent
Haering et al.

(10) Patent No.: US 12,311,704 B2
(45) Date of Patent: May 27, 2025

(54) WHEEL UNIT OF A VEHICLE AND A VALVE ASSEMBLY FOR A WHEEL UNIT

(71) Applicants: ILLINOIS TOOL WORKS INC., Glenview, IL (US); KT PROJEKTENTWICKLUNGS GMBH, Heilbronn (DE)

(72) Inventors: Andreas Haering, Owingen (DE); Bruno Schulze Selting, Rielasingen-Worblingen (DE); Erwin Braun, Owingen (DE); Martin Spindler, Herdwangen-Schönach (DE)

(73) Assignees: Illinois Tool Works Inc., Glenview, IL (US); KT Projektentwicklungs GmbH, Heilbronn (DE)

( * ) Notice: Subject to any disclaimer, the term of this patent is extended or adjusted under 35 U.S.C. 154(b) by 413 days.

(21) Appl. No.: 17/865,618

(22) Filed: Jul. 15, 2022

(65) Prior Publication Data
US 2023/0026449 A1    Jan. 26, 2023

(30) Foreign Application Priority Data
Jul. 20, 2021    (DE) ............... 10 2021 118 898.9

(51) Int. Cl.
*B60C 23/00*    (2006.01)

(52) U.S. Cl.
CPC .. *B60C 23/00318* (2020.05); *B60C 23/00354* (2020.05); *B60C 23/00363* (2020.05); *B60C 23/00327* (2020.05)

(58) Field of Classification Search
CPC ........ B60C 23/00354; B60C 23/00327; B60C 23/00363; B60C 23/00318; B60C 23/003
See application file for complete search history.

(56) References Cited

U.S. PATENT DOCUMENTS

| | | | |
|---|---|---|---|
| 10,500,905 B2 * | 12/2019 | Dunning | B60C 23/00318 |
| 2004/0055291 A1 | 3/2004 | Meydieu et al. | |
| 2017/0211719 A1 * | 7/2017 | Blessing | B60C 23/00372 |

FOREIGN PATENT DOCUMENTS

| | | |
|---|---|---|
| DE | 10 2014 219 982 A1 | 4/2016 |
| DE | 10 2016 107 582 A1 | 10/2017 |
| FR | 2 896 725 A1 | 8/2007 |

* cited by examiner

*Primary Examiner* — S. Joseph Morano
*Assistant Examiner* — Alex Plamer
(74) *Attorney, Agent, or Firm* — McAndrews, Held & Malloy, Ltd.

(57) ABSTRACT

A wheel unit of a vehicle having a rim on which a tire is mounted, and having a hub which can rotate about an axis of rotation (T), wherein the hub includes a hub body in which a control element that is mounted such that it is displaceable relative to the hub body in the direction of the axis of rotation (T) between a first position and a second position is accommodated. A fluid channel which fluidically connects the tire to a first space formed between the control element and the hub body is configured in the rim. In the first position of the control element, a fluidic connection between the first space and a second space formed between the control element and the rim is interrupted, whereas, in the second position of the control element, a fluidic connection between the first space and the second space is established.

20 Claims, 10 Drawing Sheets

WHEEL UNIT OF A VEHICLE AND A VALVE ASSEMBLY FOR A WHEEL UNIT

CROSS-REFERENCE TO RELATED APPLICATION

German Patent Application No. DE 10 2021 118 898.9, filed 21 Jul. 2021, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present invention relates generally to the field of vehicles with air-filled tires and, in particular, to the field of pressure adjustment of vehicle tires.

Discussion of Related Art

Vehicle tires are typically filled with compressed air. Filling with other pressurized media is also conceivable, for example with nitrogen. Vehicle tires in the sense of the present disclosure can be, for example, tubed or tubeless tires. Vehicle tires are used in passenger vehicles, buses, commercial vehicles, and also in aircraft, for example.

Conventional vehicle tires are typically supplied with a pressurized media via external connections, i.e., with compressed air or with a nitrogen inflating. Standard valves are commonly used for this purpose. Depending on the respective usage and operating conditions, vehicle tires typically have an optimal operating/filling pressure. For instance, for land vehicles such as cars, buses, and trucks, there are operating pressures or pressure ranges that can ensure the most optimum possible rolling resistance, lateral guidance, longitudinal guidance, heat generation, and/or wear behavior.

For example, an existing actual pressure in a tire can fluctuate within certain limits as a function of the ambient or operating temperature. Furthermore, in the long term, a certain pressure drop, such as a so-called "creeping" pressure drop, often cannot be entirely avoided.

Systems for vehicles are known that permit monitoring of the operating/filling pressure in tires. These can be so-called active or passive systems. For example, passive systems can be designed in order to determine and compare the rolling circumferences of the tires of one axle. If significant differences are found, this indicates that there are pressure differences in the respective tires. Active systems for measuring and/or monitoring compressed air typically include sensors for pressure sensing that are integrated in a wheel unit. Such pressure sensors can be configured, for example, in order to transmit corresponding pressure signals wirelessly or wired from the (rotating) tire to fixed components of the vehicle.

Furthermore, systems have generally become known that enable a self-sufficient adjustment of the filling pressure of vehicle tires. Such systems can be found in off-road vehicles, military vehicles, and similar special purpose vehicles, for example. The systems can, in principle, be configured in order to allow for an adjustment of the filling pressure in the idling state of the vehicle, i.e., when the vehicle is not moving.

SUMMARY OF THE INVENTION

In order to inflate a vehicle tire with a pressure medium, generally compressed air, it is known to provide a valve on the vehicle wheel, via which valve the pressure medium can be introduced into the tire. In passenger cars, trucks, utility vehicles, or trailers, such valves are typically arranged in the area of a rim on which the tire is mounted, such that they are easily accessible to a person who wishes to inflate the tire. Typically, a vehicle-external pressure medium source can be connected to the valve of the tire, usually by means of a hose line, in order to be able to check and, if necessary, correct the tire pressure.

This method of tire pressure regulation has the fundamental disadvantage that a regulation can only be carried out in locations where a pressure medium source is present, for example at gas stations, because, in every case, a coupling to a vehicle-external pressure medium source is necessary.

In principle, it is desirable to be able to autonomously regulate tire pressure, for example in order to quickly adapt the tire pressure to changed loading conditions, road surfaces, and ambient temperatures in long-distance traffic. Known systems for self-sufficient pressure regulation in vehicles have a central structure. In other words, there is only one device for supplying the pressurized media for inflating the tires.

It is also conceivable to provide a few devices for supplying the pressurized media, for example in a combination of a tractor machine and a trailer or semi-trailer. Nevertheless, such a central supply device for compressed air is provided for inflating a plurality of wheel assemblies, in particular on different axles or shafts. For this purpose, the central compressed air/pressurized media supply unit is coupled to a plurality of wheel assemblies. Thus, the supply unit is usually mounted on the chassis side or on the body side or on the coachwork side of the vehicle. The supply unit can include, for example, a compressor or air compressor.

Starting from the supply unit, it is now necessary to lay a plurality of compressed air or pressurized media lines to the individual wheel assemblies. In doing so, a plurality of so-called rotary lead-throughs for the pressurized media lines must be regularly provided. This is due to the fact that the tires of the wheel assemblies are typically rotatably accommodated on axles of the vehicle.

Accordingly, central compressed air supply systems for vehicle tires can often only be implemented with increased cost of implementation. In particular, tire pressure control systems in vehicles are often associated with high installation or retrofitting costs. Thus, the prevalence of such systems is relatively limited.

Against this background, the problem of the invention is to specify a wheel unit, in particular for a pressure medium supply device, wherein a tire pressure regulation is implementable with significantly little effort. As far as possible, a control and/or adjustment of the tire pressure during the journey, i.e., also with rotating wheels, should be permitted. Furthermore, if possible, a wheel change or a tire change should be permitted without additional effort.

The pressure medium supply device is designed in order to be particularly suitable as a retrofitting solution. It is further preferred that the pressure medium supply device can also advantageously be used for repairing flat tires. In many cases, it should be possible to repair or provisionally remedy the damage without any assembly effort This problem is solved in particular by a wheel unit according to the independent Claim 1, wherein advantageous embodiments and further developments of the wheel unit according to the invention are specified in the corresponding dependent Claims.

Accordingly, the invention relates in particular to a wheel unit of a vehicle having a rim on which a tire that is or can be filled with a fluid, in particular air, is or can be mounted. The wheel unit according to the invention further comprises a hub rotatable about an axis of rotation, on which hub the rim is in particular releasably connected or connectable.

The wheel unit according to the invention is in particular characterized in that the hub of the wheel unit comprises a hub body in which a control element displaceably mounted relative to the hub body in the direction of the axis of rotation between a first position and a second position is accommodated at least regionally.

Furthermore, according to the present invention, it is provided that at least one fluid channel is formed in or on the rim, which fluidically connects the tire to a first space formed between the control element and the hub body, in particular annular space.

In this context, in particular, it is expedient that in the first position of the control element, a fluidic connection between the first space and one between the control element and the rim, and in particular one between the control element and a wheel flange, is interrupted. In the second position of the control element, a fluidic connection is formed between the first space and the second space.

The wheel unit according to the invention represents a particularly easily implementable, but nevertheless effective, solution with which vehicle tires can also be regulated during travel. In particular, the solution is suitable for retrofitting existing vehicles that do not have the functionality of pressure regulation.

According to realizations of the wheel unit according to the invention, it is provided that at least one fluid channel is configured in the hub body, which channel serves to form a fluidic connection between the first space and the second space when the control element is in its second position. Preferably, in this embodiment, sealing means are provided in order to seal the first space from the outside atmosphere when the control element is in its first position.

Various solutions are possible for the sealing means. In this context, in particular, it is expedient that the sealing means are embodied as O-rings arranged between the hub body and the rim.

According to embodiments of the wheel unit according to the invention, it is provided that the hub body has a sealing seat against which a closure part of the control element is pressed in the first position of the control element. By contrast, in the second position of the control element, a fluidic connection between the first space and the second space is formed via an intermediate space of the sealing seat and the closure part.

With regard to the control element, according to implementations of the wheel unit according to the invention, it is provided that sealing means are associated with said control element, which are configured in order to seal the second space from the outside atmosphere in the second position of the control element. The sealing means associated with the control element are also preferably embodied as O-rings, wherein, of course, other solutions are also possible.

Preferably, a biasing element should be associated with the control element in order to bias the control element to its first position. A corresponding spring element is suitable as a biasing element, for example.

In this context, in particular, it is expedient that the control element is configured in order to be transferred from its first position to its second position with the aid of a control pressure acting on the control element. Alternatively, however, it is also conceivable that the control element is actuated with the aid of an actuator, in particular an electrical actuator or electromagnetic actuator.

According to preferred implementations of the wheel unit according to the invention, it is provided that the hub body is at least partially or regionally bowl or cup-shaped, wherein the control element is at least regionally accommodated inside the bowl or cup-shaped region such that it is displaceable relative to the hub body between the first and the second position.

It is further expedient in this context that the control element is at least partially or regionally sleeve-shaped and is configured in order to at least partially or regionally accommodate a valve assembly, in particular a bidirectionally operating valve assembly, for the tire.

Thus, the invention further relates to a valve assembly for inflating or at least partially deflating a tire of a wheel unit of a vehicle, in particular a wheel unit of the aforementioned type according to the invention, selectively or as needed.

The valve assembly according to the invention comprises an in particular canister- or cartridge-shaped valve body having a first port for control and/or working pressure, which is configured in particular on a first end region of the valve body, an outlet separate from the first port for releasing air selectively or as needed when at least partially deflating the tire, and a second port which is configured in particular on a second end region of the valve body opposite to the first end region, via which working pressure can be supplied to the tire selectively or as needed, and air from the tire can be supplied to the outlet.

The valve assembly according to the invention, which in particular comprises a canister or cartridge-shaped valve body, is particularly suited for being accommodated at least partially or regionally in the control element of the wheel unit, which is designed in a sleeve-shaped manner.

According to implementations of the valve assembly according to the invention, it is provided that it comprises a first control element, in particular in the form of a control piston, which is displaceably mounted in the valve body (in particular canister- or cartridge-shaped) relative to the valve body between a first position and a second position.

In the first position of the first control element, a fluidic connection between the outlet and the second port of the valve assembly is interrupted. By contrast, in the second position of the first control element, a fluidic connection is established between the outlet and the second port of the valve assembly.

According to embodiments of the valve assembly according to the invention, it is provided in particular that it further comprises a second control element, which is displaceably mounted in the (in particular canister- or cartridge-shaped) valve body relative to the valve body between a first position and a second position. In the first position of the second control element, a fluidic connection between the first port and the second port of the valve assembly is interrupted. By contrast, in the second position of the second control element, a fluidic connection is established between the first port and the second port of the valve assembly.

With this design, a special compact valve assembly can be realized.

According to embodiments of the valve assembly according to the invention, it is provided that the first control element comprises a (fluid) chamber that is fluidically connected or connectable to the first port of the valve assembly via a fluid channel and to the second port of the valve assembly via a second (fluid) chamber.

In this context, it is provided in particular that the second control element is accommodated in the (fluid) chamber and is displaceable relative to the first control element between its first position and its second position.

In the first position of the second control element, a fluidic connection between the chamber and the first fluid channel is interrupted, whereas in the second position of the second control element, a fluidic connection between the first port and the second port of the valve assembly is formed by the first fluid channel, the (fluid) chamber, and the second fluid channel.

According to implementations of the valve assembly according to the invention, it is provided that a biasing element is associated with the first control element in order to bias the first control element into its first position. Preferably, the biasing element is embodied as a spring element.

Alternatively and additionally in this context, it can be provided that a biasing element, in particular in the form of a spring element, is also associated with the second control element, in order to bias the second control element to its first position.

According to embodiments of the valve assembly according to the invention, it is provided that a first, in particular annular fluid space is configured between the first control element and the valve body, which is fluidically connected to the second port of the valve assembly, and which is fluidically connected to the outlet of the valve assembly when the first control element is in its second position.

In this context, it is conceivable that the valve body has a sealing seat against which, in the first position of the first control element, a closure part of the first control element is pressed. By contrast, in the second position of the first control element, a fluidic connection is established between the first fluid space and the outlet of the valve assembly via an intermediate space of the sealing seat and the closure part.

In order to actuate the first control element, it is preferably provided that it comprises a control surface which is configured in order to transfer the first control element from its first position to its second position upon application of a biasing force of a biasing element associated with the first control element.

The invention also relates further to a combination of the previously described valve assembly according to the invention and the wheel unit according to the invention. Accordingly, the invention relates in particular to a system having a wheel unit of the type according to the invention and a valve assembly of the type according to the invention, wherein the valve assembly is accommodated at least partially or regionally in the control element of the hub body of the wheel unit.

BRIEF DESCRIPTION OF SEVERAL VIEWS OF THE DRAWINGS

Exemplary embodiments of the present invention are described in further detail below with reference to the accompanying drawings.

DESCRIPTION OF PREFERRED EMBODIMENTS

Figures 1, 2:
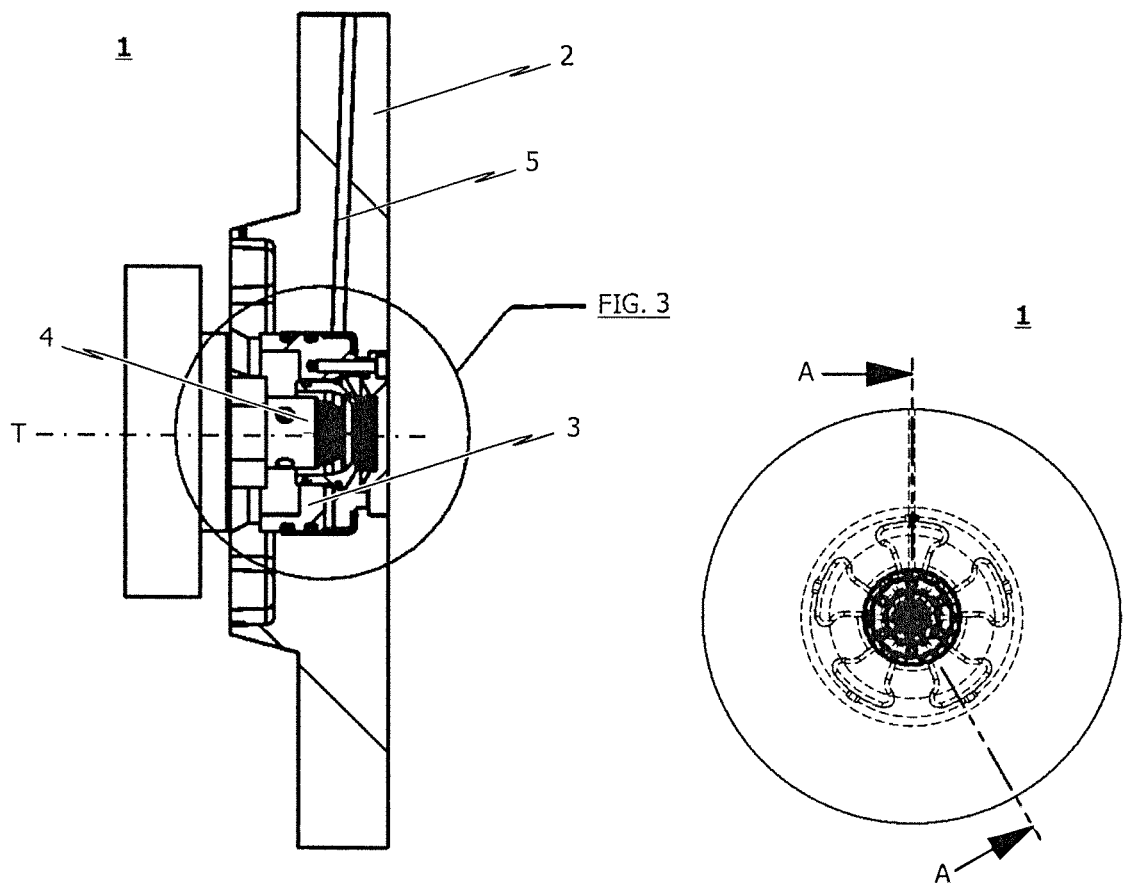
FIG. 1 schematically shows a partially cut view of an exemplary embodiment of the wheel unit according to the invention in the decoupled state.
FIG. 2 schematically shows a top plan view of the exemplary embodiment of the wheel unit according to the invention according to FIG. 1.

A first exemplary embodiment of the wheel unit 1 according to the invention is first described in further detail in the following with reference to the illustrations in FIG. 1 to FIG. 8. Specifically, two different states of the wheel unit 1 are shown, namely the so-called decoupled state (cf. FIG. 1 to FIG. 4) as well as the so-called coupled state (cf. FIG. 5 to FIG. 8).

In the decoupled state, there is no fluidic connection between the vehicle hub and the vehicle rim 2. By contrast, in the coupled state of the wheel unit 1, a fluidic connection between the vehicle hub and the rim 2 is realized, such that a pressure regulation of a tire (not shown in the drawings) can be carried out via this fluidic connection to a valve assembly 20 accommodated in the hub.

Specifically, the exemplary embodiment of the wheel unit 1 according to the invention shown in the drawings is a wheel unit 1 of a vehicle having a rim 2 and a hub that is rotatable about an axis of rotation T. A tire that can be inflated with compressed air (not shown) is or can be mounted on the rim 2.

The rim 2 is in particular releasably connectable in the hub, which can be rotated about an axis of rotation T.

The hub comprises a hub body 3, which, in the illustrated embodiment, is formed at least partially or regionally in a bowl or cup shape. A control element 4 is accommodated in the bowl- or cup-shaped hub body 3. The control element 4 is at least partially or regionally sleeve-shaped and is configured in order to at least partially or regionally accommodate a valve assembly 20, in particular a bidirectionally operating valve assembly 20, for the tire mounted on the rim 2.

An embodiment of a suitable valve assembly 20 is shown in FIG. 9 through FIG. 13 and will be described in further detail below.

The sleeve-shaped control element 4 accommodated inside the bowl- or cup-shaped hub body 3 is displaceable relative to the hub body 3 in the direction of the axis of rotation T of the hub between a first position (which corresponds to the decoupled position according to FIG. 1 to FIG. 4) and a second position (which corresponds to the coupled position according to FIG. 5 to FIG. 8).

Figure 3:
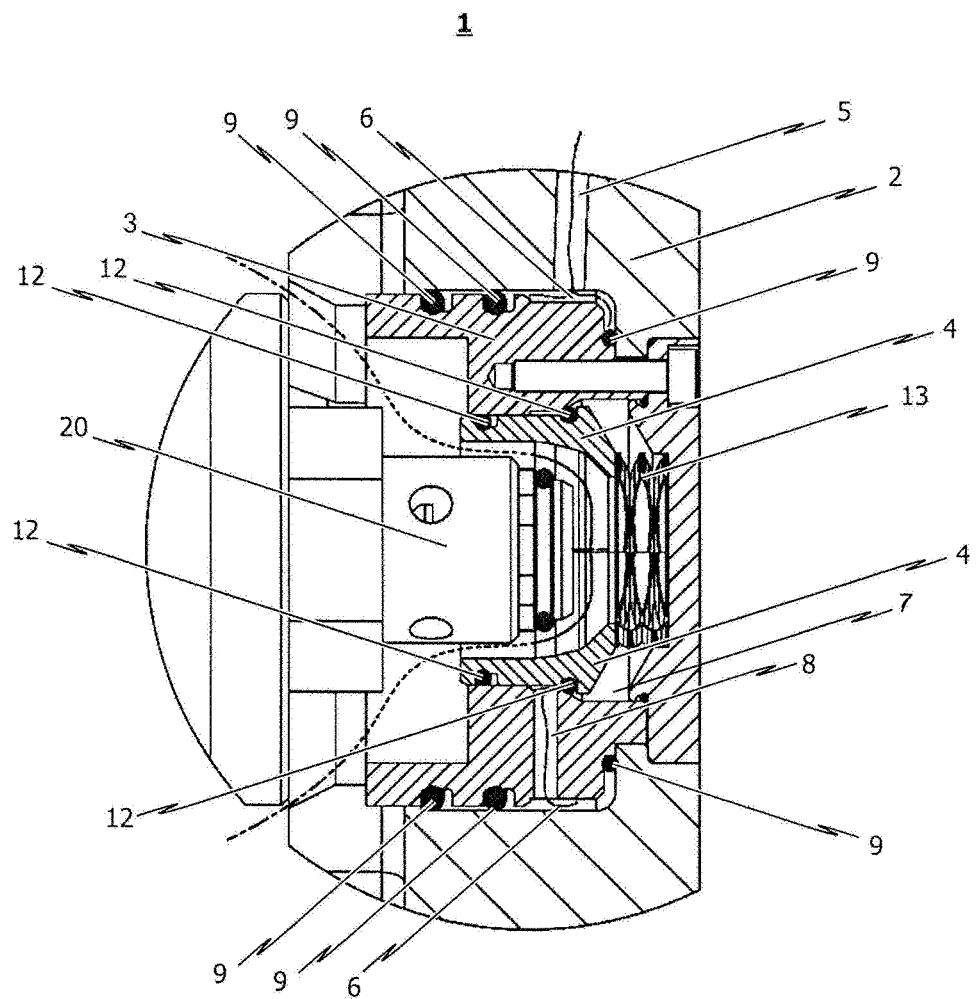
FIG. 3 schematically shows a detail view of the exemplary embodiment of the wheel unit according to FIG. 1, taken along the line A-A in FIG. 2.
Figure 4:
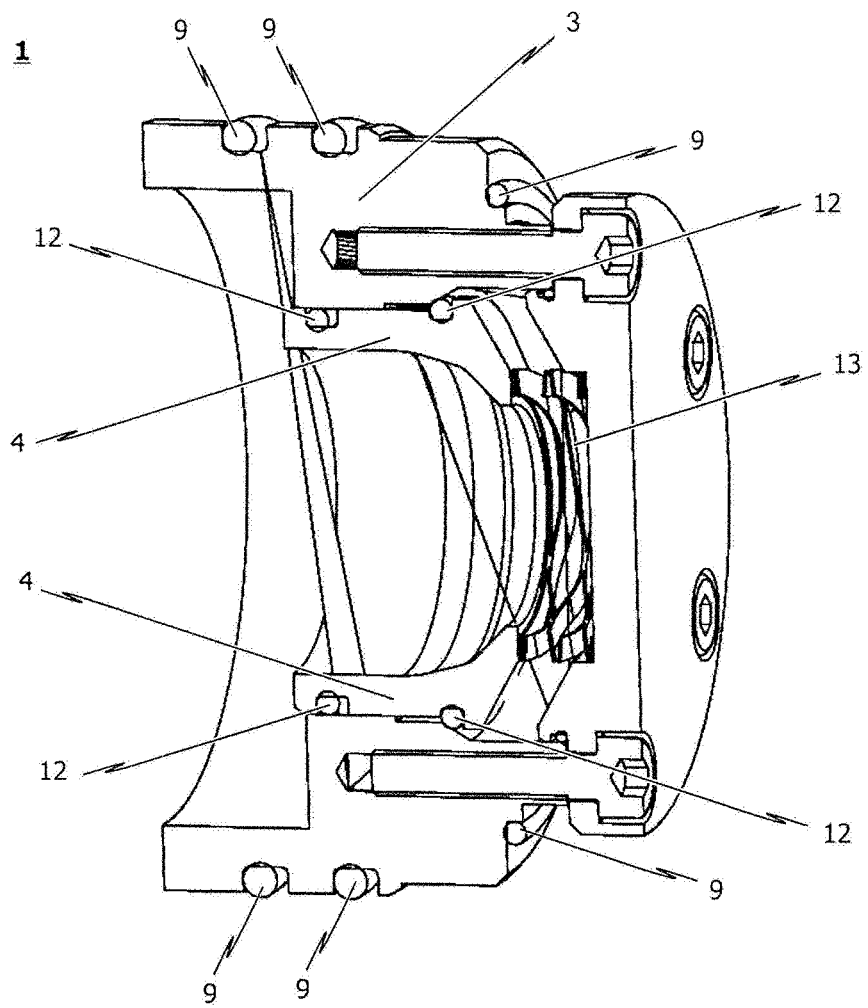
FIG. 4 schematically shows a partially cut isometric view of parts of the wheel unit according to FIG. 1.
Figures 5, 6:
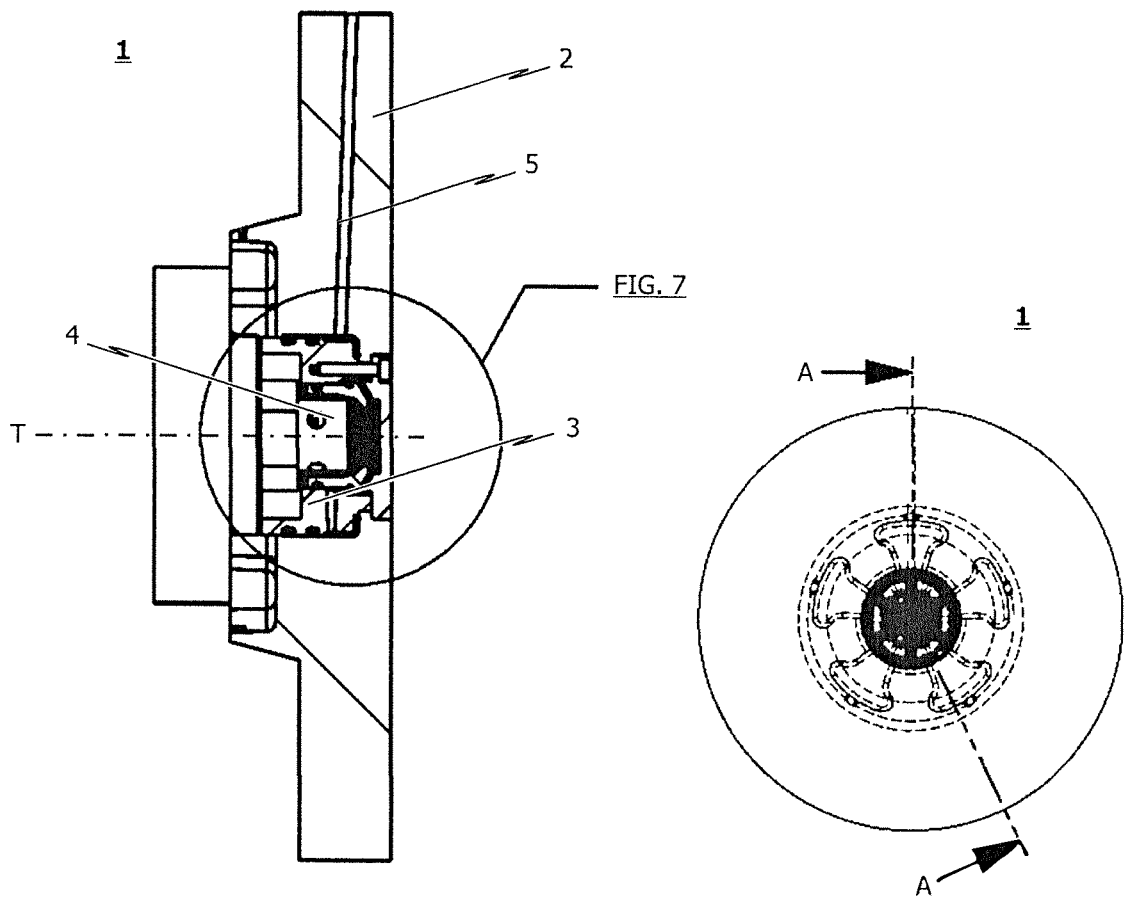
FIG. 5 schematically, and in a partially cut view, shows the exemplary embodiment of the wheel unit according to the invention in a coupled state.
FIG. 6 schematically shows a top plan view of the wheel unit according to FIG. 5.
Figure 7:
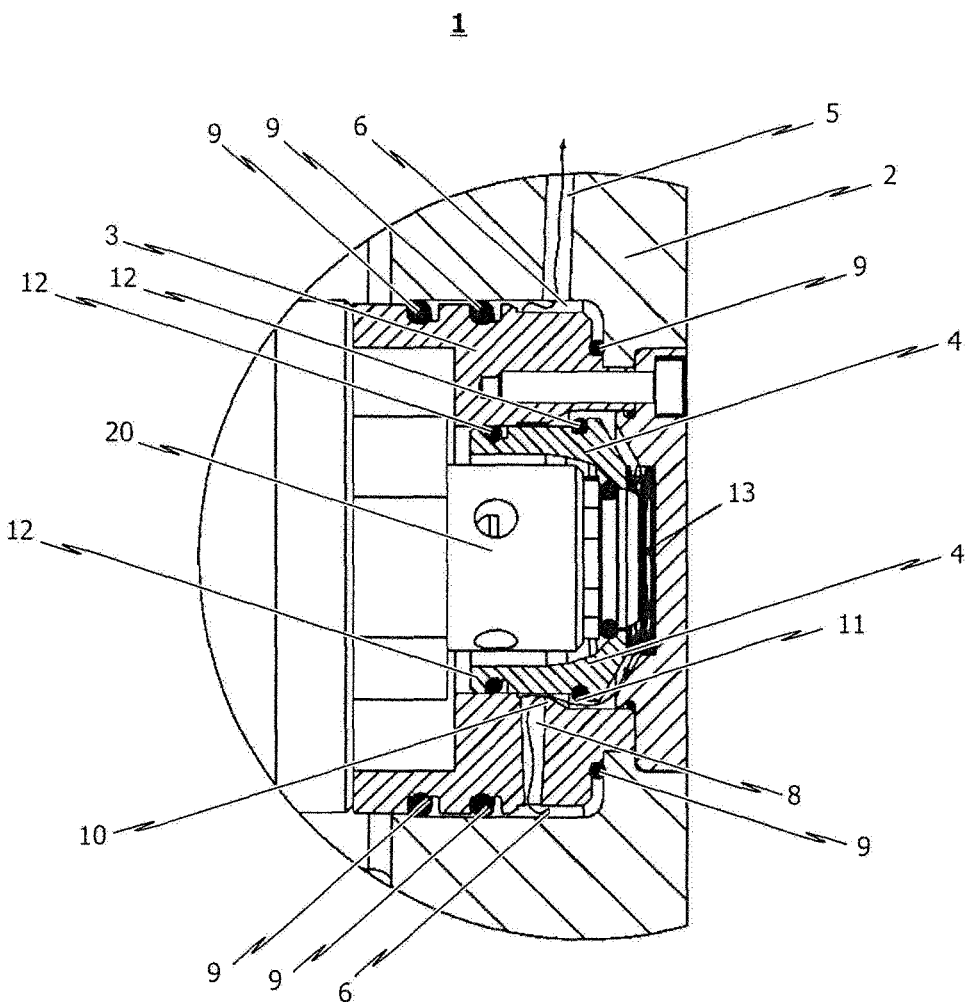
FIG. 7 schematically shows a detail view of the exemplary embodiment of the wheel unit according to FIG. 5, taken along the line A-A in FIG. 4.
Figure 8:
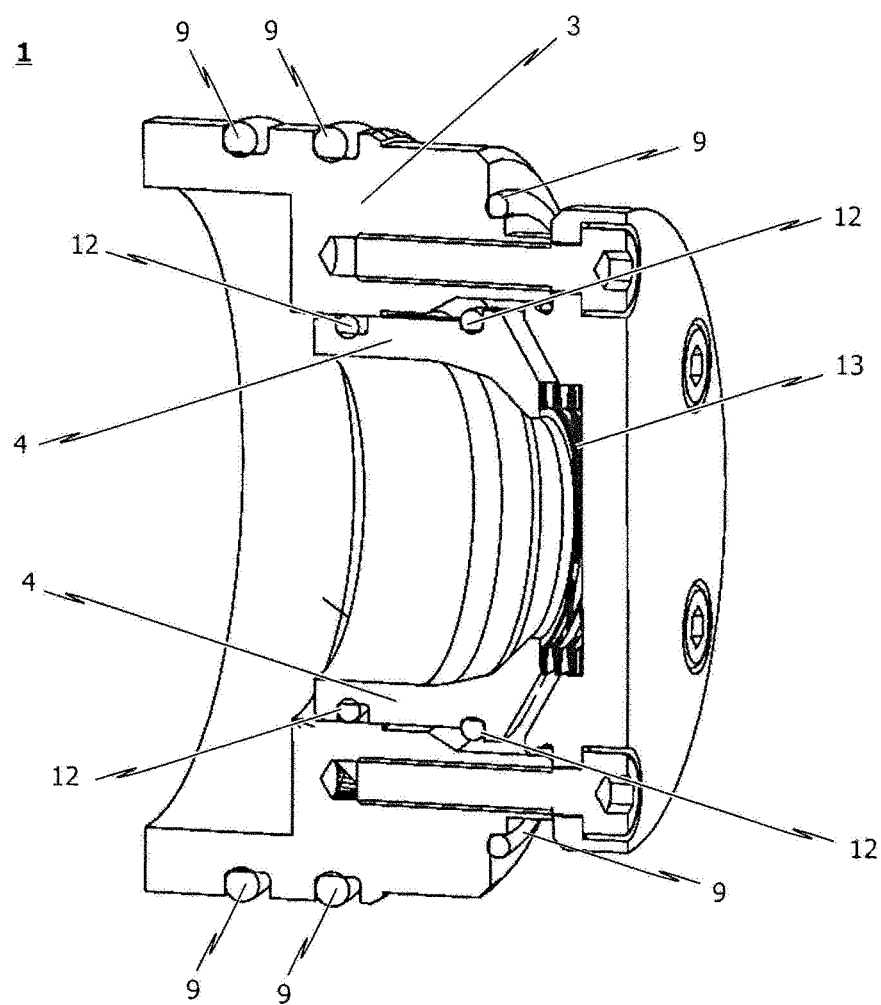
FIG. 8 schematically shows a partially cut isometric view of parts of the wheel unit according to FIG. 5.

From the detail views in FIG. 3 and FIG. 7, it can be seen that at least one fluid channel 5 is formed in or on the rim 2, which fluidically connects the tires of the wheel unit 1 (not shown in the drawings) to a first space 6 (annular space) formed between the control element 4 and the hub body 3.

In the first position of the control element 4, which represents the decoupled state of the wheel unit 1, a fluidic connection between the first space 6 (annular space) and a second space 7 formed between the control element 4 and the rim 2 is interrupted, as can be seen in particular from the detail view according to FIG. 3.

By contrast, in the second position of the control element 4, which corresponds to the coupled state of the wheel unit 1, a fluidic connection is established between the first space 6 (annular space) and the second space 7 between the control element 4 and the rim 2, as can be seen from the detail view according to FIG. 7.

It can further be seen from the detail views according to FIG. 3 and FIG. 7 that at least one fluid channel 8 is formed in the hub body 3, which channel serves to form a fluidic connection between the first space 6 (annular space) and the second space 7 when the control element 4 is in its second position, corresponding to the coupled state of the wheel unit 1. In this context, reference is made in particular to the detail view in FIG. 7.

Further, it can be seen in the drawings that in the exemplary embodiment of the wheel unit 1 according to the invention, sealing means 9 are provided for sealing the first space 6 from the outside atmosphere when the control element 4 is in its first position (cf. in particular FIG. 3). The sealing means 9 are in particular embodied as O-rings arranged between the hub body 3 and the rim 2.

Specifically, in the exemplary embodiment of the wheel unit 1 according to the invention shown in the drawings, the hub body 3 comprises a sealing seat 10 against which a closure part 11 of the control element 4 is pressed in the first position of the control element 4. By contrast, in the second position of the control element 4, a fluidic connection between the first space 6 and the second space 7 is formed via an intermediate space between the sealing seat 10 and the closure part 11.

The control element 4 is further associated with sealing means 12 which are configured in order to seal the second space 7 from the outside atmosphere in the second position of the control element 4.

In particular, the illustrations in FIG. 3, FIG. 4, FIG. 7, and FIG. 8 show that a biasing element 13 in the form of a spring element is associated with the control element 4 in order to bias the control element 4 in its first position.

Here, it is provided that the control element 4 is configured in order to be transferred from the first position to the second position with the aid of a control pressure acting on the control element 4 or with the aid of an actuator, in particular an electric or electromagnetic actuator, while overcoming the biasing force of the biasing element 13.

Referring to the illustrations in FIG. 9 to FIG. 13, an embodiment of the valve assembly 20 according to the invention is described in further detail below.

The valve assembly 20 is embodied as a bi-directionally operating valve assembly and serves to inflate or at least partially deflate a tire of a wheel unit 1 of a vehicle, in particular a wheel unit 1 as described previously with reference to the illustrations in FIG. 1 to FIG. 8, selectively or as needed.

Figure 9:
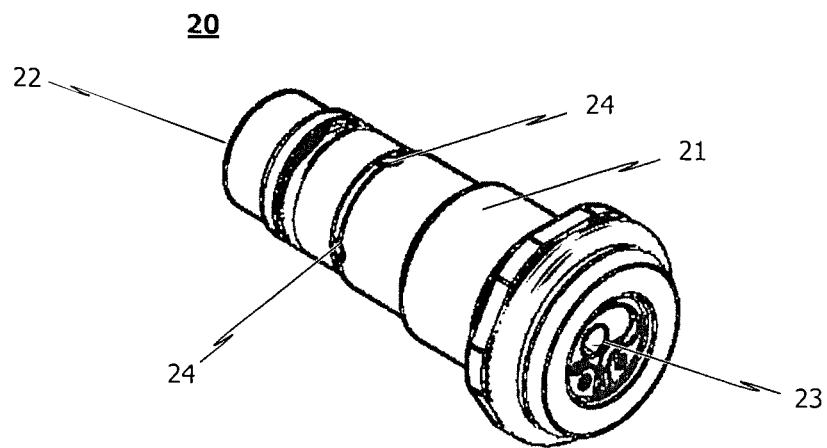
FIG. 9 schematically, and in an isometric view, shows an exemplary embodiment of the valve assembly according to the invention.
Figure 10:
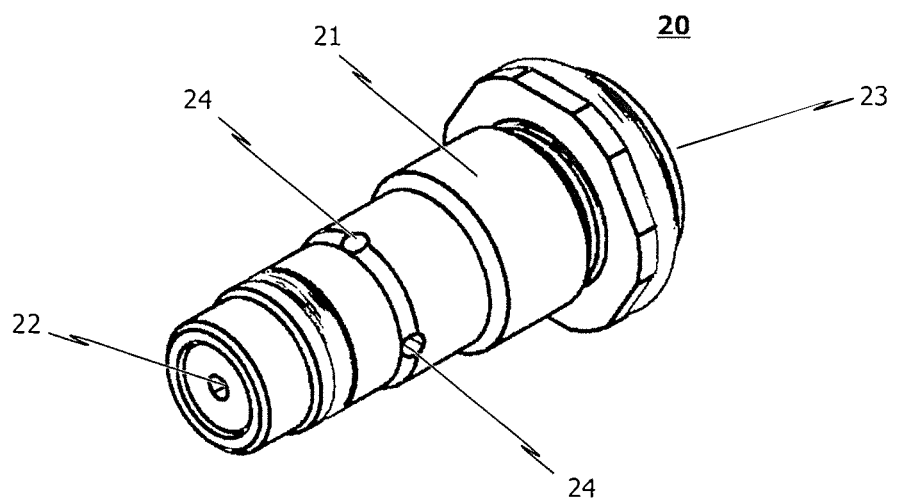
FIG. 10 schematically, and in a further isometric view, shows the exemplary embodiment of the valve assembly according to the invention according to FIG. 9.

As can be seen in particular from the isometric views according to FIG. 9 and FIG. 10, the exemplary embodiment of the valve assembly 20 according to the invention comprises an in particular canister- or cartridge-shaped valve body 21. The valve assembly 20 is suitable, at least partially or regionally, to be accommodated in the sleeve-like control element 4 of the wheel unit 1.

In particular, the canister- or cartridge-shaped valve body 21 comprises a first port 22 configured at a first end region of the valve body 21 for control and/or working pressure, as well as a second port 23 configured at a second end region of the valve body 21 opposite the first end region.

Furthermore, outlets 24 are formed in the valve body 21 in order to release air when at least partially deflating the tire, selectively or as needed. By way of the second port 23, working pressure can be supplied to the tire (not shown in the drawings) as needed, or air can be supplied to the outlet 24 of the valve assembly 20 when deflating the tire.

Figure 11:
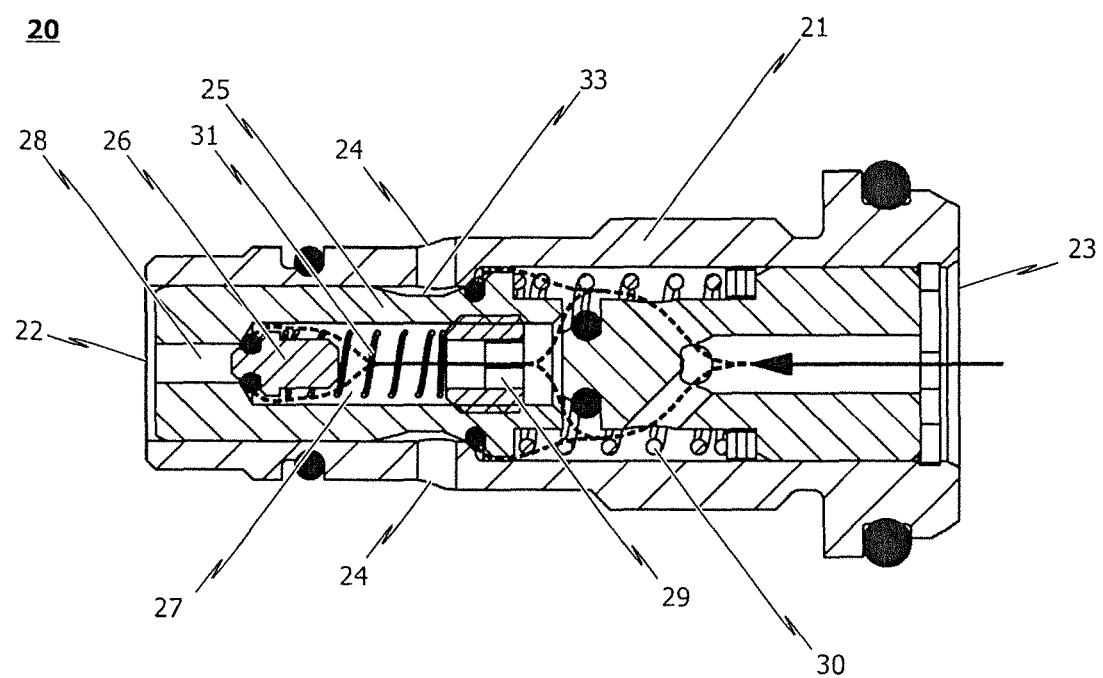
FIG. 11 schematically, and in a sectional view, shows the exemplary embodiment of the valve assembly according to the invention in a closed state.
Figure 12:
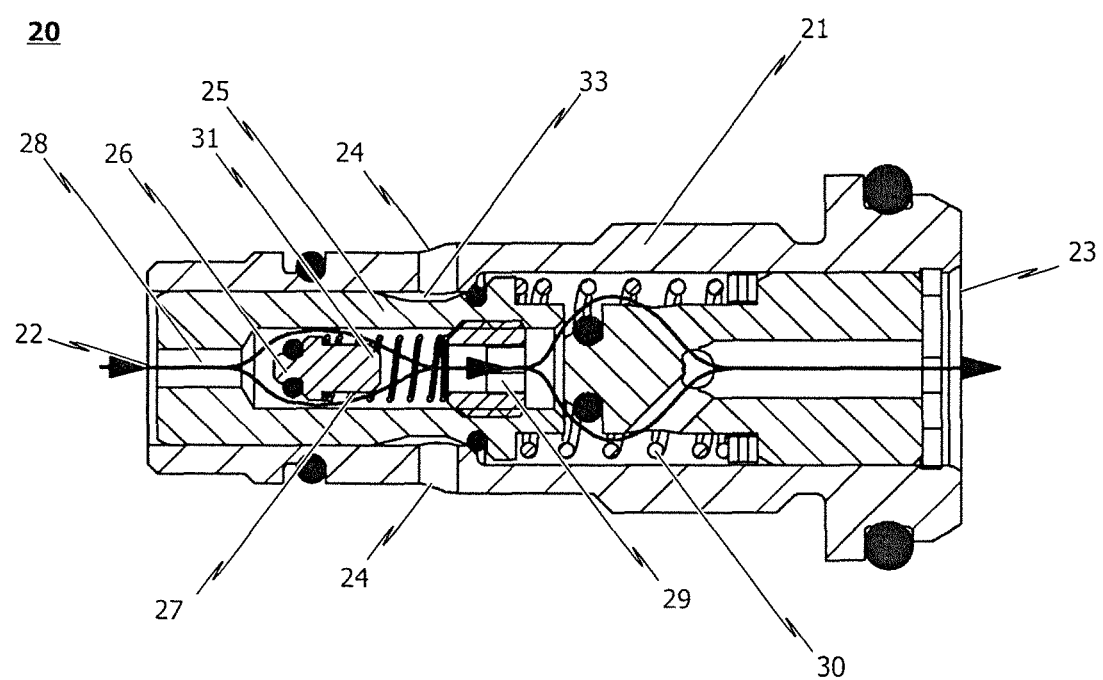
FIG. 12 schematically, and in a sectional view, shows the exemplary embodiment of the valve assembly according to the invention while inflating a tire (not shown)
Figure 13:
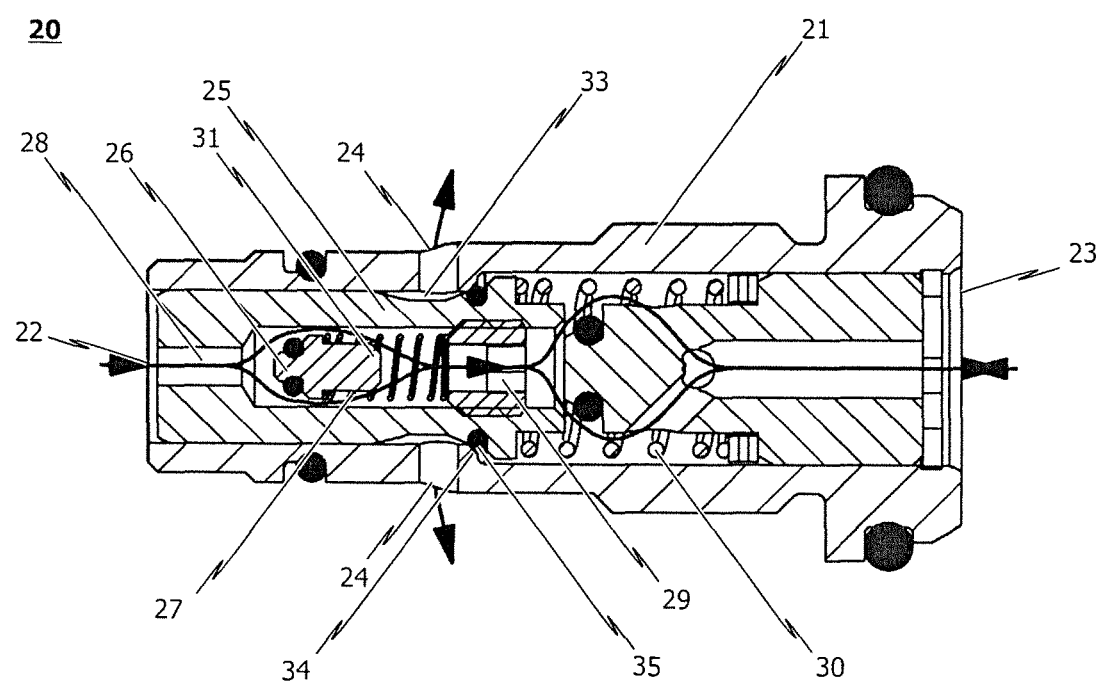
FIG. 13 schematically, and in a sectional view, shows the exemplary embodiment of the valve assembly according to the invention while deflating a tire (not shown).

From the sectional views in FIG. 11 to FIG. 13, it can be seen that the valve assembly 20 comprises a first control element 25 in the form of a control piston, which is displaceably mounted in the valve body 21 relative to the valve body 21 between a first position (cf. FIG. 11 and FIG. 13) and a second position (cf. FIG. 12). In the first position of the first control element 25 (cf. FIG. 11 and FIG. 13), a fluidic connection between the outlet 24 and the second port 23 is interrupted. By contrast, in the second position of the first control element 25 (cf. FIG. 12), a fluidic connection is established between the outlet 24 and the second port 23.

From the sectional views according to FIG. 11 to FIG. 13, it can be seen that the valve assembly 20 further comprises a second control element 26. Here, the first and second control elements 25, 26 are arranged axially relative to the valve body 21.

The second control element 26 is displaceably mounted in the valve body 21 relative to the valve body 21 (and relative to the first control element 25) between a first position and a second position.

In the first position of the second control element 26 (cf. FIG. 11 and FIG. 13), a fluidic connection between the first port 22 and the second port 23 of the valve assembly 20 is interrupted. By contrast, in the second position of the second control element 26 (cf. FIG. 12), a fluidic connection is established between the first port 22 and the second port 23. Thus, in the second position of the second control element 26, the tire can be inflated.

The first and second control elements 25, 26 are each associated with a biasing element 30, 31 in the form of a spring element in order to bias the respective control elements 25, 26 to their first position.

The first control element 25 has a fluid chamber 27 inside of it, which is fluidically connected or connectable to the first port 22 via a first fluid channel 28 and to the second port 23 via a second fluid channel 29. The second control element 26 is accommodated in the fluid chamber 27 and is displaceable relative to the first control element 25 between its first position and its second position.

In the first position of the second control element 26 (cf. FIG. 11 or FIG. 13), a fluidic connection between the fluid chamber 27 and the first fluid channel 28 is interrupted. By contrast, in the second position of the second control element 26 (cf. FIG. 12), a fluidic connection is established between the first port 22 and the second port 23 of the valve assembly 20 via the first fluid channel 28 of the fluid chamber 27 and the second fluid channel 29.

A first, in particular annular fluid space 33 is configured between the first control element 25 and the valve body 21, which is fluidically connected to the second port 23, and which is fluidically connected to the outlet 24 of the valve assembly 20 when the first control element 25 is in its second position.

Specifically, in the exemplary embodiment of the valve assembly 20 according to the invention, it is provided that the valve body 21 has a sealing seat 34 against which a closure part 35 of the first control element 25 is pressed in the first position of the first control element 25. By contrast, in the second position of the first control element 25, a fluidic connection is established via an intermediate space between the sealing seat 34 and the closure part 35, which connects the fluid space 33 to the outlet 24 of the valve assembly 20.

As indicated in FIG. 13, the first control element 25 comprises a control surface which is configured in order to transfer the first control element 25 from its first position to its second position upon application of a biasing force of the biasing element 30 associated with the first control element 25.

The invention is not limited to the embodiments shown in the drawings, but rather results when all of the features disclosed herein are considered together.

It is claimed:

1. A wheel unit of a vehicle having a rim on which a tire that is or can be inflated with a fluid is or can be mounted, and having a hub that can rotate about an axis of rotation (T) and to which the rim is or can be connected, wherein the hub comprises:
    a hub body in which a control element is mounted such that it is displaceable relative to the hub body in a direction of the axis of rotation (T) between a first position and a second position, wherein at least one fluid channel fluidically connects the tire to a first space formed between the control element and the hub body configured in or on the rim, wherein, in the first position of the control element, a fluidic connection between the first space and a second space formed between the control element and a wheel flange of the rim, is interrupted, and wherein, in the second position of the control element, a fluidic connection between the first space and the second space is established,
    wherein the control element is at least partially or regionally sleeve-shaped and is configured to at least partially or regionally accommodate a valve assembly for the tire.

2. The wheel unit according to claim 1, wherein the first space is an annular space.

3. The wheel unit according to claim 1, wherein the valve assembly is a bidirectionally operating valve assembly.

4. The wheel unit according to claim 1, wherein at least one fluid channel is configured in the hub body in order to create a fluidic connection between the first space and the second space when the control element is in its second position, wherein a seal is provided for sealing the first space from an outside atmosphere when the control element is in its first position, wherein the seal is embodied as one or more O-rings arranged between the hub body and the rim.

5. The wheel unit according to claim 1, wherein the hub body comprises a sealing seat against which, in the first position of the control element, a closure part of the control element is pressed, wherein, in the second position of the control element, a fluidic connection between the first space and the second space via an intermediate space of the sealing seat and the closure part is established.

6. The wheel unit according to claim 1, wherein the control element is associated with a seal that is configured in order to seal the second space from an outside atmosphere in the second position of the control element.

7. The wheel unit according to claim 1, wherein the control element is associated with a spring element configured to bias the control element in its first position.

8. The wheel unit according to claim 1, wherein the hub body is at least partially or regionally bowl-shaped or cup-shaped, and wherein the control element is at least regionally accommodated inside the bowl or cup-shaped region such that it is displaceable relative to the hub body between the first position and the second position.

9. The wheel unit according to claim 1, wherein the control element is configured to be transferred from the first position to the second position with a control pressure acting on the control element or with aid of an actuator.

10. The wheel unit according to claim 9, wherein the actuator is an electric actuator or an electromagnetic actuator.

11. A system with a valve assembly for inflating or at least partially deflating a tire of a wheel unit of a vehicle having a rim on which the tire is or can be mounted, the system comprising:
    a hub that can rotate about an axis of rotation (T) and to which the rim is or can be connected, wherein the hub comprises: a hub body in which a control element is mounted such that it is displaceable relative to the hub body in a direction of the axis of rotation (T) between a first position and a second position, wherein at least one fluid channel fluidically connects the tire to a first space formed between the control element and the hub body configured in or on the rim, wherein, in the first position of the control element, a fluidic connection between the first space and a second space formed between the control element and a wheel flange of the rim is interrupted, and wherein, in the second position of the control element, a fluidic connection between the first space and the second space is established,
    a valve assembly comprising a canister-shaped or cartridge-shaped valve body having a first port for control and/or working pressure, wherein the first port is configured on a first end region of the valve body, an outlet separate from the first port for releasing fluid selectively or as needed when at least partially deflating the tire, and a second port configured on a second end region of the valve body opposite to the first end region, via which working pressure can be supplied to the tire selectively or as needed, and fluid from the tire can be supplied to the outlet.

12. The system of claim 11, wherein the valve assembly is accommodated at least partially or regionally in the control element of the hub body of the wheel unit.

13. The system according to claim 11, wherein the valve assembly comprises a first control element in the form of a control piston, which is mounted in the valve body such that it is displaceable relative to the valve body between a first position and a second position, wherein, in the first position of the first control element, a fluidic connection between the outlet and the second port of the valve assembly is interrupted, and wherein, in the second position of the first control element, a fluidic connection between the outlet and the second port of the valve assembly is established; and/or wherein the valve assembly comprises a second control element which is mounted in the valve body such that it is displaceable relative to the valve body between a first position and a second position, wherein, in the first position of the second control element, a fluidic connection between the first port and the second port of the valve assembly is interrupted, and wherein, in the second position of the second control element, a fluidic connection between the first port and the second port of the valve assembly is established.

14. The system according to claim 13, wherein the first control element comprises a chamber which is or can be fluidically connected to the first port of the valve assembly via a first fluid channel and to the second port of the valve assembly via a second fluid channel, wherein the second control element is accommodated in said chamber and is displaceable relative to the first control element between its first position and its second position, wherein, in the first position of the second control element, a fluidic connection between the chamber and the first fluid channel is interrupted, and wherein, in the second position of the second control element, a fluidic connection between the first port and the second port of the valve assembly via the first fluid channel, the chamber and the second fluid channel is established.

15. The system according to claim 13, wherein a first, annular fluid space is configured between the first control element and the valve body, which is fluidically connected to the second port, and which is fluidically connected to the outlet of the valve assembly when the first control element is in its second position; and/or wherein the valve body comprises a sealing seat against which, in the first position of the first control element, a closure part of the first control element is pressed, wherein, in the second position of the first control element, a fluidic connection between the second port and the outlet of the valve assembly via an intermediate space of the sealing seat and the closure part is established.

16. The system according to claim 13, wherein the first control element comprises a control surface which is configured to transfer the first control element from its first position to its second position upon application of a biasing force of a biasing element associated with the first control element.

17. The system according to claim 13, wherein the first control element is associated with a first biasing element for biasing the first control element in its first position; and/or wherein the second control element is associated with a second biasing element for biasing the second control element in its first position.

18. The system according to claim 17, wherein each of the first biasing element and the second biasing element is a spring.

19. A hub of a vehicle configured to rotate about an axis of rotation (T), the hub configured to couple with a rim to which a tire can be mounted and inflated with a fluid, wherein the hub comprises:

a hub body; and a control element mounted relative to the hub body and configured to be displaced in a direction of the axis of rotation (T) between a first position and a second position, wherein the control element is at least partially or regionally sleeve-shaped and configured to at least partially or regionally accommodate a bidirectionally operating valve assembly of the tire, wherein at least one fluid channel fluidically connects the tire to a first space formed between the control element and the hub body configured in or on the rim, wherein, in the first position of the control element, a fluidic connection is interrupted between the first space and a second space formed between the control element and a wheel flange of the rim, and wherein, in the second position of the control element, the fluidic connection is established between the first space and the second space.

20. The hub according to claim 19, wherein the control element is configured to be transferred between the first position and the second position via a control pressure acting on the control element or an actuator, wherein the actuator is an electric actuator or electromagnetic actuator.

* * * * *